(12) United States Patent
Kasteler et al.

(10) Patent No.: US 11,446,531 B2
(45) Date of Patent: Sep. 20, 2022

(54) MEDICATION DISPOSAL SOLUTION

(71) Applicant: NarcX, Vineyard, UT (US)

(72) Inventors: Christian D. Kasteler, Murray, UT (US); David A. Schiller, Castle Pines, CO (US); Gavin V. Collier, Vineyard, UT (US); Jordan G. Erskine, South Jordan, UT (US)

(73) Assignee: NARCX, Vineyard, UT (US)

( * ) Notice: Subject to any disclaimer, the term of this patent is extended or adjusted under 35 U.S.C. 154(b) by 378 days.

(21) Appl. No.: 16/174,227

(22) Filed: Oct. 29, 2018

(65) Prior Publication Data

US 2019/0126084 A1 May 2, 2019

Related U.S. Application Data

(60) Provisional application No. 62/577,863, filed on Oct. 27, 2017.

(51) Int. Cl.
| | |
|---|---|
| *A62D 3/33* | (2007.01) |
| *B09B 3/00* | (2022.01) |
| *A62D 3/36* | (2007.01) |
| *A62D 101/28* | (2007.01) |

(52) U.S. Cl.
CPC ............. *A62D 3/33* (2013.01); *A62D 3/36* (2013.01); *B09B 3/0075* (2013.01); *A62D 2101/28* (2013.01)

(58) Field of Classification Search
CPC ........ A62D 3/33; A62D 3/36; A62D 2101/28; B09B 3/0075
USPC ...................................................... 588/315
See application file for complete search history.

(56) References Cited

U.S. PATENT DOCUMENTS

| | | | |
|---|---|---|---|
| 5,413,714 A | 5/1995 | DeFilippi et al. | |
| 7,867,511 B2 | 1/2011 | Anderson et al. | |
| 8,535,711 B2 | 9/2013 | Anderson et al. | |
| 2005/0112068 A1 | 5/2005 | Warner et al. | |
| 2009/0131732 A1* | 5/2009 | Day ........................ | A62D 3/36 588/249.5 |
| 2018/0185687 A1 | 7/2018 | Fowler et al. | |
| 2018/0250287 A1* | 9/2018 | Schwarz .................. | A61K 9/06 |

OTHER PUBLICATIONS

Ikuo Abe et al., "Adsorption of Local Anesthetics on Activated Carbon: Freundlich Adsorption Isotherms", Departmenl of Anesthesia, University of Utah School of Medicine, 1990 Vol. 79, No. 4, Jul. 7, 1989, pp. 354-358.
Cheremisinoff, "Handbook of Water and Wastewater Treatment Technologies", N&P Limited, 1st Edition, Nov. 29, 2001, pp. 1-3, 411-413.
The Dow Chemical Company, "Methocel Cellulose Ethers Technical Handbook", Sep. 2002, pp. 1-32.
Sellers et al., "Comparative Drug Adsorption by Activated Charcoal", Journal of Pharmaceutical Sciences, 1977, vol. 66, No. 11, Nov. 1977, pp. 1640-1641.

\* cited by examiner

*Primary Examiner* — Edward M Johnson
(74) *Attorney, Agent, or Firm* — Kunzler Bean & Adamson

(57) ABSTRACT

Disposal means for large scale efficient disposal of medication and controlled substances comprising a homogeneous mixture of one or more surfactants, aerobic enzymes, anaerobic enzymes, soluble bitterants, insoluble bitterants, colorants, excipients, thickener agents, and humectant. Unwanted medication and controlled substances, such as opioids, are introduced to the solution and rendered inert and/or useless.

20 Claims, 3 Drawing Sheets

MEDICATION DISPOSAL SOLUTION

CROSS-REFERENCE TO RELATED APPLICATIONS

This patent application claims the benefit of U.S. Provisional Patent Application No. 62/577,863, filed Oct. 27, 2017 and entitled "MEDICATION DISPOSAL SOLUTION, MEANS AND METHOD FOR RENDERING DRUGS AND CONTROLLED SUBSTANCES USELESS AND INERT," which is incorporated herein by reference.

FIELD

This invention relates to medication waste disposal, and more particularly relates to a homogeneous mixture for rendering controlled substances inert, unpalatable or useless.

BACKGROUND

Accidental overdose deaths involving prescription opioids has become a national epidemic. Along with deaths from opioids, problems with unemployment and violent crimes have skyrocketed in every state on the country. Pharmaceutical companies producing opioids, benzodiazepines, and other addictive and commonly-abused substances sometimes warehouse millions of dosages of these medications, the disposal of which is of paramount importance to law enforcement and health regulators including the Drug Enforcement Agency (DEA) and the Federal Drug Administration (FDA). Regulators have established drug disposal programs involving drug disposal facilitates to collect and dispose of medication and controlled substances in mass. Similar concerns exist with amphetamines, cannabis, and other controlled substances.

The FDA recommends mixing expired and unused prescription drugs with "unpalatable" substances such as used kitty litter, waste or coffee grounds because efficient means of dissolving, destroying or rendering these substances inert or useless do not exist in the art despite recognition of the fact by the FDA such means are needed. The FDA suggests that opioids be disposed of in a toilet, however many of opioids are simply stored by users indefinitely until discovered by drug addicts. However, with the disposing of medications into the sewage system, the medication can pass through sewage treatment centers and into the environment unchanged.

Other established drug disposal programs will require collection and transport of medication, creating logistical concerns and in many cases compounding the availability of these medications in a single location to addicts while endangering transportation personnel. Thus, there is a need for more efficient disposal and sequestration of active ingredients from medicaments.

SUMMARY

A solution for medication disposal is disclosed. A method of manufacturing and of using the solution is also provided. The solution may include a solvent, activated carbon, an insoluble bitterant, a soluble bitterant, a colorant, and a surfactant. In further embodiments, the solution includes enzymes, humectants, thickening agents, pH modifiers, and preservatives. The method of manufacture includes providing each of the above substances in a solvent. To use the solution, a medicament is introduced into the solution.

These features and advantages of the present invention will become more fully apparent from the following description and appended claims, or may be learned by the practice of the invention as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
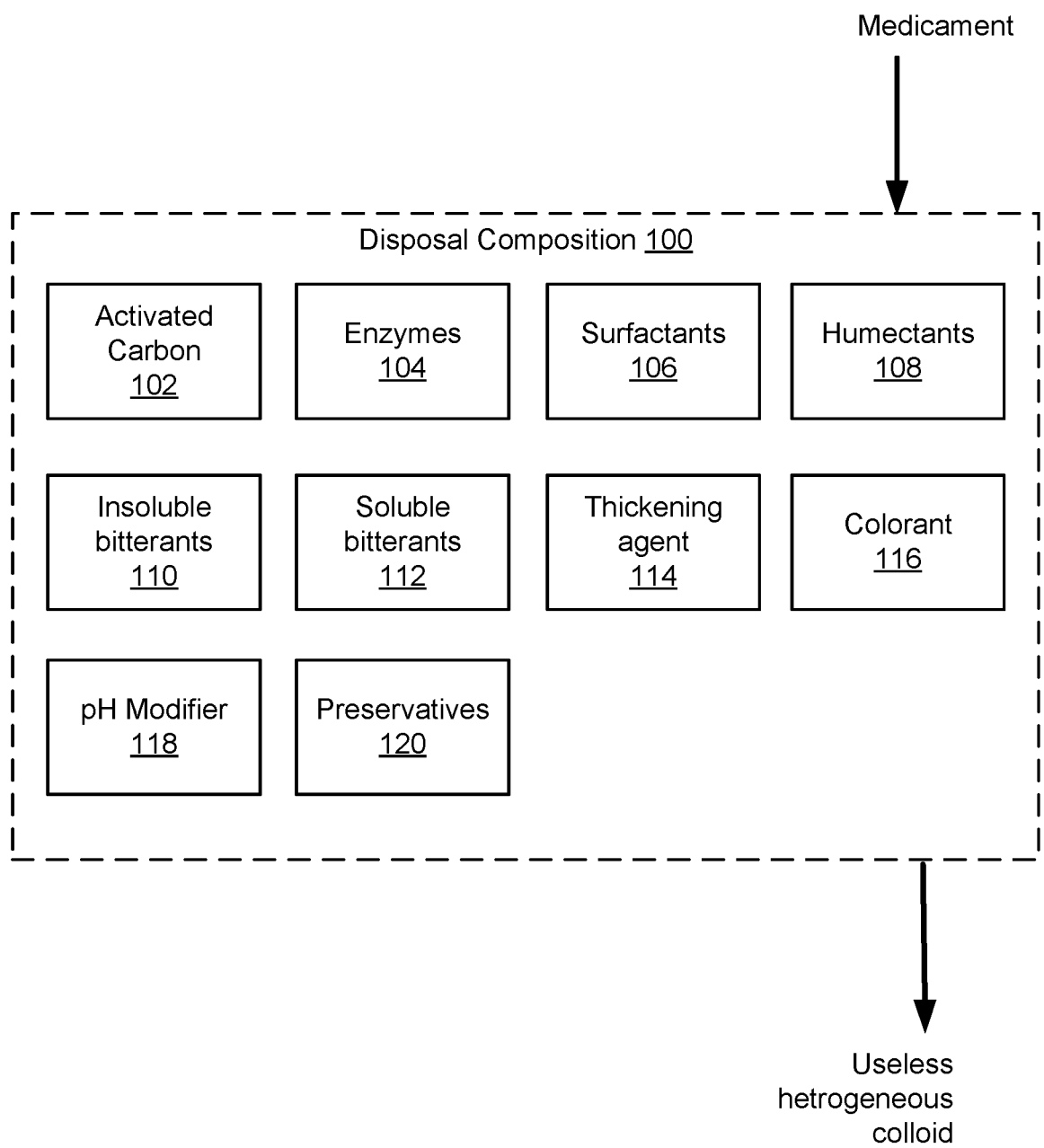
FIG. 1 is a block diagram illustrating the substances and compounds forming a homogeneous disposal mixture in accordance with embodiments of the present disclosure.

FIG. 1 is a schematic block diagram illustrating one embodiment of the substances of a composition 100 for disposing of and rendering useless medicaments in accordance with embodiments of the present disclosure. The composition 100 is configured to render medication, including controlled substances, inert and/or useless, such as opioids, opiates, phenethylamines, amphetamines, and SSRIs. The composition 100 provides a disposal solution for dissolving and dispersing the medication.

In certain embodiments, the composition 100 includes activated carbon 102, enzymes 104, surfactants 106, humectants 108, insoluble bitterants 110, soluble bitterants 112, thickening agents 114, colorants 116, pH modifiers 118, and preservatives 120 in a solvent. The solvent, in some embodiments, is water that may be filtered. Containers containing the solvent and the composition can vary in size from a prescription pill bottle to up 330-gallon containers.

The activated carbon 102, in some embodiments, acts as a neutralizing agent to "deactivate" the active ingredients of the medication, psychoactive substance, etc. The term "deactivate" as used herein, refers to adsorbing, irreversibly, the active ingredients of the disposed drug. Activated carbon 102 is useful for adsorbing the active ingredients of drugs because of the high internal surface area of the activated carbon due to the porosity of the activated carbon. In certain embodiments, the activated carbon 102 has a large surface area in the range of between about 500 to 1500 m² per gram. In further embodiments, the activated carbon 102 has a surface area in the range of between about 950 to 1050 m² per gram. Additionally, the activated carbon 102 may have a pH in the range of between about 7 to 9. The particle size may be varied to adjust adsorption rates. In other words, smaller particle sizes lead to faster adsorption rates from the solvent, thereby increasing the mass transfer rate of the drugs from the solvent to the carbon. Particle sizes (as measured by the amount that will pass through a mesh) suitable for use in accordance with embodiments of the present disclosure include, but are not limited to, 65-85% 325 mesh (0.045 mm sieve size), 85-95% 200 mesh (0.075 mm sieve size), and 95-100% 325 mesh. Additionally, smaller particle sizes help slow the settle rate of the activated carbon 102 in the solvent, and add opacity to the fluid, which aides in hiding the drugs within the solvent.

The enzymes 104, in certain embodiments may include aerobic and anaerobic enzymes. The enzymes 104 are provided to accelerate the breakdown of complex molecules that may contain active drug compounds. The enzymes may be non-bacterial broad-spectrum enzymes with or without nonionic surfactant packages and catalysts. Examples of enzymes 104 suitable for use with embodiments of the present disclosure include, but are not limited to, fungal and bacterial derived enzymes such as lytic polysaccharide monooxygenases.

The surfactants 106, in some embodiments, help in dissolving drug compounds into the carrier fluid (e.g., solvent) and help "wet" fillers that may be hydrophobic. The surfactants 106 also break down drugs to release active compounds, and may help dissolve oil-based compounds. The surfactants 106 may use different compounds that have varying hydrophilic-lipophilic balance ("HLB") levels (i.e., the measure of the degree to which the surfactant is hydrophilic or lipophilic). HLB levels suitable for use with embodiments of the present disclosure include, but are not limited to, a range of between about 10 and 18. Examples of suitable surfactants include, but are not limited to, polysorbate 20 (HLB of 16.7) and polysorbate 80 (HLB 15).

The composition 100, in certain embodiments, may include humectants 108 to increase the solubility of compounds and prevent the solution (e.g., composition dissolved into the solvent) from evaporating and the residue ("sludge") from being consumed. Additionally, the humectant 108 also aids in wetting of solids placed in the solution and helps maintain the activated carbon 102 in suspension. One example of a humectant 108 suitable for use in embodiments of the present disclosure include, but is not limited to, glycerin. In particular, the glycerin may be provided with less than 5% water.

In some embodiments, the composition 100 includes water insoluble bitterants 110. Water insoluble bitterants may be colloidally suspended and exist heterogeneously in the composition 100 as an aversion agent, adapted to sicken (e.g., induce vomiting) prospective abusers attempting to ingest the solution. Aversion agents are flavored substances, often approved as food additives by the FDA, to discourage consumption. Aversion agents are not harmful, only unpleasant to consume. Additionally, the insoluble bitterant introduces a very undesirable and bitter taste. One example of a water insoluble bitterant suitable for use in embodiments of the present disclosure includes sucrose octaacetate. In additional embodiments, the composition 100 includes a soluble bitterant 112 to help prevent diversion (i.e., theft of the drug during disposal). One example of a soluble bitterant 112 includes denatonium benzoate. Together, the insoluble and the soluble bitterants work together with the colorant to help reduce diversion if anyone were to try to extract unadsorbed compounds from the solution. The insoluble bitterant 110 remains suspended in the solvent, while a soluble bitterant 112 is adsorbed, along with the medicaments, into the active carbon. Accordingly, someone that attempts to consume either the solvent or the sludge in the solution will be sickened.

In one embodiment, the composition includes the thickening agent 114. The thickening agent 114 increases the viscosity of the solvent and functions to help suspend the carbon and other solids in the solution. Additionally, the thickening agent 114 coats and covers pill that someone may attempt to remove from the solution. One example of a thickening agent 114 suitable for use with embodiments of the present disclosure is hydroxyethylcellulose (e.g., Natrasol 250), or carboxymethyl cellulose CMC.

The composition 100 may also include a colorant 116 configured to add color and opacity, together with the activated carbon 102, to the solution. The color and opacity increase the difficulty, via security by obscurity, of determining if the solution contains any drugs, pills, etc., that have not yet been adsorbed by the activated carbon 102. The colorant 116 may also include a stain that stains a person's hands or mouth, for example, that attempts to extract drugs from the solution. The stain further colors any pills in the solution to increase the difficulty in identifying which drug is in the solution, and whether it is worthwhile to try and extract the drug. One example of a colorant 116 suitable for use in embodiments of the present invention includes, but is not limited to, FD&C Blue #1.

The composition 100, in certain embodiments, includes a pH modifier to maintain a proper pH of the solution. Examples include sodium hydroxide or hydrochloric acid, in varying amounts, to maintain a pH in a range of between about 8 and 11, and in further embodiments of about 10. Additionally, the composition may include preservative compounds 120 to help preserve the solution and suppress growth of microbes introduced with the drugs into the solution. Examples of suitable preservatives include, but are not limited to, sodium benzoate (reduces the ability of microbes to reproduce), phenoxyethanol (suppresses the growth of bacteria, yeast, and mold), and a silver ion donator (silver nitrate and silver citrate).

In some embodiments, the substances described above may be mixed with the following mass % examples, which further illustrate the embodiments of the present disclosure. The below examples are illustrative only and are not intended, nor should they be interpreted, to limit the scope of the embodiments. Although many different variations have been found to work, a few are depicted here.

| Sample # | 1 | 2 | 3 | 4 | 5 | 6 | 7 |
|---|---|---|---|---|---|---|---|
| Water | 90.643 | 72.694 | 86.827 | 68.527 | 89.197 | 87.097 | 90.644 |
| Glycerin | 0.15 | 0.15 | .25 | 0.25 | .25 | 0.25 | 0.15 |

-continued

| Sample # | 1 | 2 | 3 | 4 | 5 | 6 | 7 |
|---|---|---|---|---|---|---|---|
| Activated Carbon | 7 | 25 | 7 | 25 | 7 | 7 | 7 |
| Poly Sorbate 20 | 0.15 | 0.15 | 2 | 2 | 0.15 | 2 | 0.15 |
| Poly Sorbate 80 | 0.2 | 0.2 | 0.25 | 0.25 | 0.2 | 0.25 | 0.2 |
| Sucrose Octaacetate | 0.6 | 0.6 | 0.6 | 0.6 | 0.6 | 0.6 | 0.6 |
| Denatonium Benzoate | 0.003 | 0.003 | 0.003 | 0.003 | 0.003 | 0.003 | 0.003 |
| Sodium Benzoate | 0.4 | 0.4 | 0.2 | 0.2 | 0.4 | 0.1 | 0.4 |
| Phenoxyethanol | 0.05 | 0.05 | 0.02 | 0.02 | 0.05 | 0.01 | 0.05 |
| Natrosol 250 or CMC | 0.2 | 0.15 | 0.2 | 0.2 | 0.2 | 0.08 | 0.2 |
| Water based color | 0.002 | 0.002 | 0.05 | 0.05 | 0.05 | 0.01 | 0.002 |
| E2 Enzymes | 0.1 | 0.1 | 1.25 | 1.25 | 0.75 | 1.25 | 0.1 |
| B1 Enzymes | 0.1 | 0.1 | 1.25 | 1.25 | 0.75 | 1.25 | 0.1 |
| Sodium Hydroxide | 0.4 | 0.4 | 0.1 | 0.4 | 0.4 | 0.1 | 0.4 |
| Silver Nitrate | 0.002 | 0.001 | 0 | 0 | 0 | 0 | 0.001 |

The above mass percentages may be altered while still maintaining an effective drug disposal solution, an example of a viability window of alterations includes:

|  | Low mass % | High mass % |
|---|---|---|
| Water |  |  |
| Glycerin | 0.1 | 3 |
| Activated Carbon | 3 | 25 |
| Poly Sorbate 20 | 0.02 | 5 |
| Poly Sorbate 80 |  |  |
| Sucrose Octaacetate | 0.4 | 1.2 |
| Denatonium Benzoate | 0.001 | 0.005 |
| Sodium Benzoate | 0.3 | 0.5 |
| Phenoxyethanol | 0.01 | 0.08 |
| Natrosol 250 or CMC | 0.02 | 0.36 |
| Water based color | 0.002 | 0.5 |
| E2 Enzymes/B1 Enzymes | 0.001 | 3 |
| Sodium Hydroxide | 0.4 NaOH | 0.4 HCL |
| Silver Nitrate | .002 | 0.04 |

Figure 2:
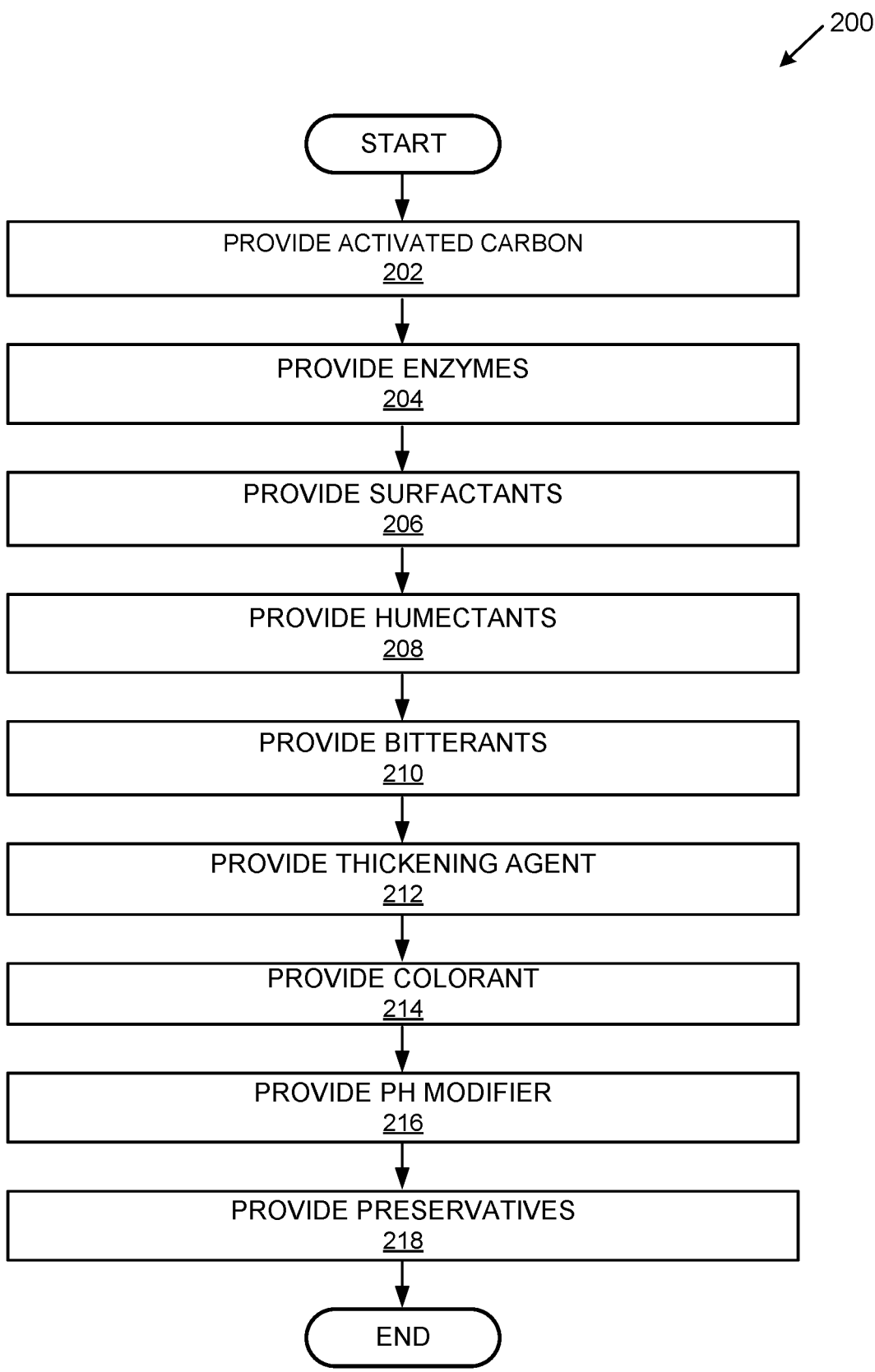
FIG. 2 is a flow chart illustrating the steps of a method of rendering inert a medication within a homogeneous disposal mixture in accordance with embodiments of the present disclosure.

FIG. 2 is a flow chart illustrating one embodiment of a method of manufacturing the solution in accordance with embodiments of the present disclosure. The method 200 begins and, at block 202, activated carbon is provided and mixed into the solvent. At block 204, enzymes are provided and mixed into the solvent. At block 206, surfactants are provided and mixed into the solvent. At block 208, humectants are provided and mixed into the solvent. At block 210, bitterants are provided and mixed into the solvent. At block 212, a thickening agent is provided and mixed into the solvent. At block 214, a colorant is provided and mixed into the solvent. At block 216, a pH modifier is provided and mixed into the solvent, and at block 218 preservatives are provided and mixed into the solvent. Each of the above substances may be provided as described above with reference to different chemicals and different mass percentages.

Figure 3:
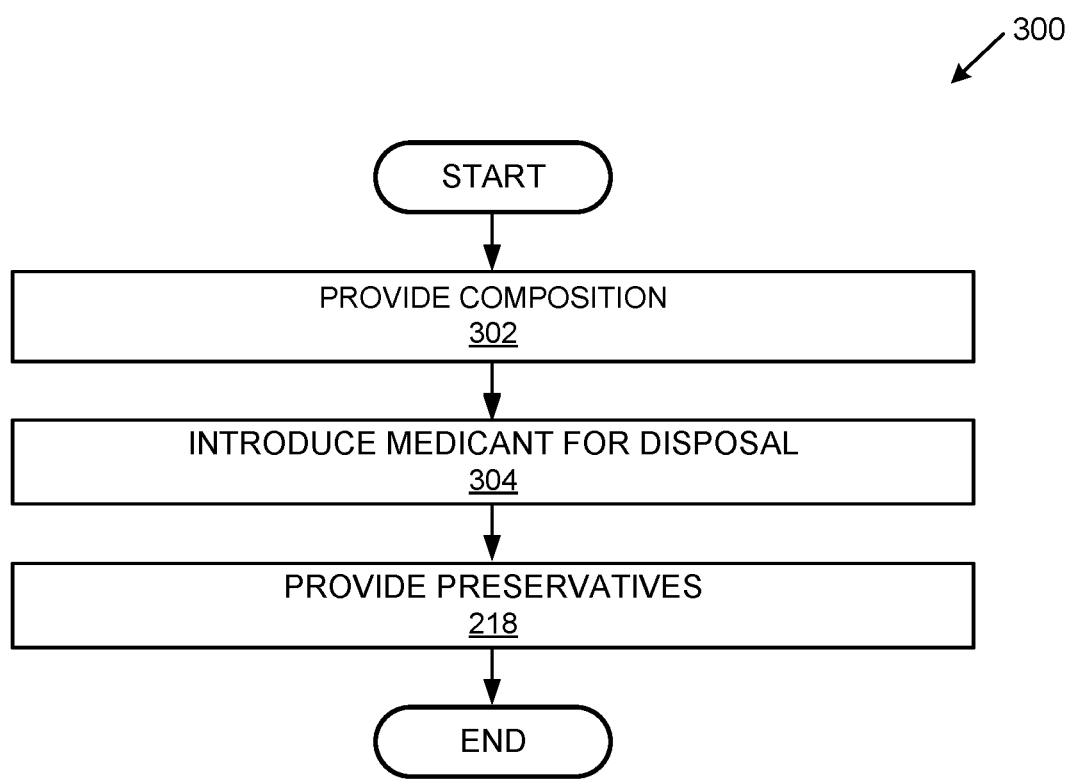
FIG. 3 is a flow chart diagram illustrating the steps of a method of rendering inert a medication within a homogeneous disposal mixture in accordance with embodiments of the present disclosure.

FIG. 3 is a flow chart illustrating one embodiment of a method of using the solution in accordance with embodiments of the present disclosure. The method 300 may start and at block 302 the composition is provided as described above with reference to FIGS. 1 and 2. At block 304, a medicament is introduced into the composition and allowed to adsorb into the activated carbon. Portions of the medicament that do not adsorb into the activated carbon are rendered useless by the colorant, insoluble bitterant, etc., as described above.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A medication disposal solution for rendering drugs useless and inert, the disposal solution comprising:
   a solvent;
   activated carbon;
   an insoluble bitterant;
   a soluble bitterant;
   a colorant; and
   a surfactant.

2. The medication disposal solution of claim 1, where the solvent comprises filtered water.

3. The medication disposal solution of claim 2, where the activated carbon has a mass percentage in the range of between about 3 and 25.

4. The medication disposal solution of claim 3, where the insoluble bitterant has a mass percentage in the range of between about 0.4 and 1.2.

5. The medication disposal solution of claim 4, where the soluble bitterant has a mass percentage in the range of between about 0.001 and 0.005.

6. The medication disposal solution of claim 5, where the colorant has a mass percentage in the range of between about 0.002 and 0.5.

7. The medication disposal solution of claim 6, where the surfactant has a mass percentage in the range of between about 0.02 and 5.

8. The medication disposal solution of claim 1, further comprising an enzyme having a mass percentage in the range of between about 0.001 and 3.

9. The medication disposal solution of claim 1, further comprising a thickening agent having a mass percentage in the range of between about 0.02 and 0.36.

10. The medication disposal solution of claim 1, further comprising a humectant having a mass percentage in the range of between about 0.1 and 3.

11. The medication disposal solution of claim 1, further comprising a pH modifier, where the pH modifier comprises sodium hydroxide.

12. The medication disposal solution of claim 1, further comprising a preservative having a mass percentage in the range of between about 0.002 and 0.04.

13. A method of manufacturing a medicament disposal solution, the steps of the method comprising:
   providing a solvent;
   providing activated carbon;
   providing an insoluble bitterant;
   providing a soluble bitterant;
   providing a colorant; and
   providing a surfactant.

14. The method of claim 13, where the activated carbon is provided with a mass percentage in the range of between about 3 and 25.

15. The method of claim 14, where the insoluble bitterant is provided with a mass percentage in the range of between about 0.4 and 1.2.

16. The method of claim 15, where the soluble bitterant is provided with a mass percentage in the range of between about 0.001 and 0.005.

17. The method of claim 16, where the colorant is provided with a mass percentage in the range of between about 0.002 and 0.5.

18. The method of claim 17, where the surfactant is provided with a mass percentage in the range of between about 0.02 and 5.

19. The method of claim 18, further comprising providing a thickening agent, an enzyme, a humectant, a pH modifier, and a preservative.

20. A method of disposing of medicaments using the medicament disposal solution manufactured according to the method of claim 18 comprises placing medicaments in the medicament disposal solution.

* * * * *